(12) United States Patent
Akata et al.

(10) Patent No.: US 11,187,598 B2
(45) Date of Patent: Nov. 30, 2021

(54) STRAIN BODY AND FORCE SENSOR PROVIDED WITH THE STRAIN BODY

(71) Applicant: NIDEC COPAL ELECTRONICS CORPORATION, Tokyo (JP)

(72) Inventors: Toyohiko Akata, Sano (JP); Subei Shun, Sano (JP); Shigeaki Shingyochi, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 168 days.

(21) Appl. No.: 16/549,231

(22) Filed: Aug. 23, 2019

(65) Prior Publication Data

US 2019/0376857 A1 Dec. 12, 2019

Related U.S. Application Data

(63) Continuation of application No. PCT/JP2017/045159, filed on Dec. 15, 2017.

(30) Foreign Application Priority Data

Feb. 24, 2017 (JP) .............................. JP2017-033447

(51) Int. Cl.
*G01L 5/1627* (2020.01)
*G01L 1/22* (2006.01)

(52) U.S. Cl.
CPC .............. *G01L 1/22* (2013.01); *G01L 1/2287* (2013.01); *G01L 5/1627* (2020.01)

(58) Field of Classification Search
CPC ........ G01L 1/22; G01L 5/1627; G01L 1/2287
See application file for complete search history.

(56) References Cited

U.S. PATENT DOCUMENTS 5,081,867 A * 1/1992 Yamada ................ G01P 15/123
                                                          73/514.33
6,393,919 B1 * 5/2002 Ohji ...................... G01L 11/002
                                                          73/708

(Continued)

FOREIGN PATENT DOCUMENTS

CN          1479859        3/2004
CN          101036040      9/2007

(Continued)

OTHER PUBLICATIONS

International Search Report for International Application PCT/JP2017/045159, dated Mar. 13, 2018.

(Continued)

*Primary Examiner* — Max H Noori
*Assistant Examiner* — Masoud H Noori
(74) *Attorney, Agent, or Firm* — Burris Law, PLLC

(57) ABSTRACT

A strain body according to an embodiment includes a central portion, an outer peripheral portion, connecting portions, strain sensors provided on main surfaces of the connecting portions, reference resistors provided on a main surface of the central portion, and constructing a bridge circuit with the strain sensors, an electrode for taking a detection signal of the bridge circuit, a lead wire making electric connection between the electrode and the outside, and an anisotropic conductive film provided between the electrode and the lead wire to make electric connection between a terminal of the electrode and a terminal of the lead wire.

9 Claims, 15 Drawing Sheets

(56) References Cited

U.S. PATENT DOCUMENTS

| | | | |
|---|---|---|---|
| 6,886,415 | B1 | 5/2005 | Kurogi et al. |
| 2004/0012062 | A1* | 1/2004 | Miyajima ............. G01L 9/0055 257/419 |
| 2004/0045372 | A1* | 3/2004 | Liu ........................... G01L 1/22 73/862.041 |
| 2007/0006668 | A1 | 1/2007 | Hirabayashi et al. |
| 2007/0266797 | A1 | 11/2007 | Hirabayashi et al. |
| 2008/0276726 | A1 | 11/2008 | Rey |
| 2011/0266923 | A1 | 11/2011 | Chuang et al. |
| 2011/0314935 | A1 | 12/2011 | Krippner et al. |
| 2013/0239701 | A1* | 9/2013 | Huang .................. G01L 5/1627 73/862.045 |
| 2013/0340537 | A1 | 12/2013 | Freiwald et al. |
| 2015/0169109 | A1* | 6/2015 | Park ...................... G06F 3/0446 345/174 |
| 2019/0226929 | A1* | 7/2019 | Suzuki .................... G01L 3/108 |
| 2019/0376855 | A1* | 12/2019 | Shun ..................... G01L 1/2262 |
| 2019/0376856 | A1* | 12/2019 | Shun ..................... G01L 1/2262 |

FOREIGN PATENT DOCUMENTS

| | | |
|---|---|---|
| CN | 101625978 | 1/2010 |
| EP | 1852688 | 11/2007 |
| JP | S6469927 | 3/1989 |
| JP | 2004239621 | 8/2004 |
| JP | 2007010379 | 1/2007 |
| JP | 2008533481 | 8/2008 |
| JP | 2010008343 | 1/2010 |
| JP | 2011112419 | 6/2011 |
| JP | 2011227015 | 11/2011 |
| JP | 2013061305 | 4/2013 |
| JP | 2015049209 | 3/2015 |
| JP | 6469927 | 2/2019 |
| WO | 2010088922 | 8/2010 |

OTHER PUBLICATIONS

Office Action issued in Corresponding CN application 201780087153.6, dated Sep. 16, 2020.
Extended European Search Report issued in corresponding EP Application 17897602.3, dated Dec. 3, 2020.

* cited by examiner

| Force and Moment | Fx | Fy | Fz | Mx | My | Mz |
|---|---|---|---|---|---|---|
| Detection circuits | BF3<br>BF7 | BF1<br>BF5 | BF2<br>BF6<br>BF4<br>BF8 | BF4<br>BF8 | BF2<br>BF6 | BF1<br>BF5<br>BF3<br>BF7 |

F I G. 6

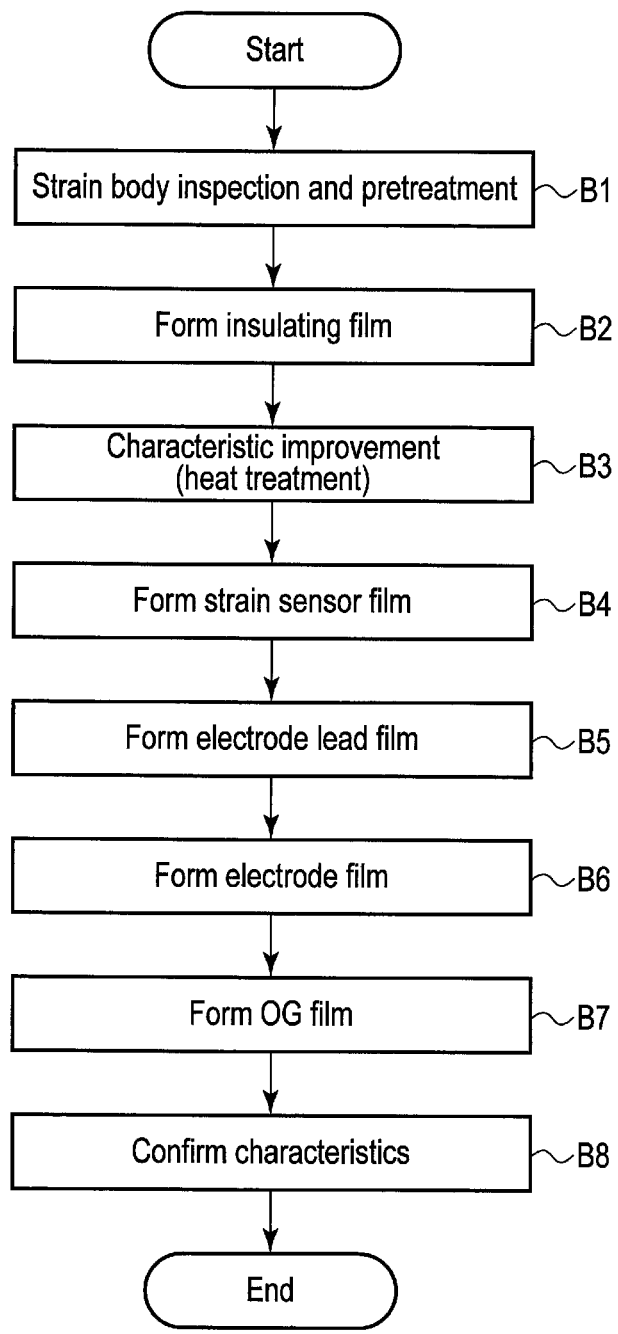
F I G. 7

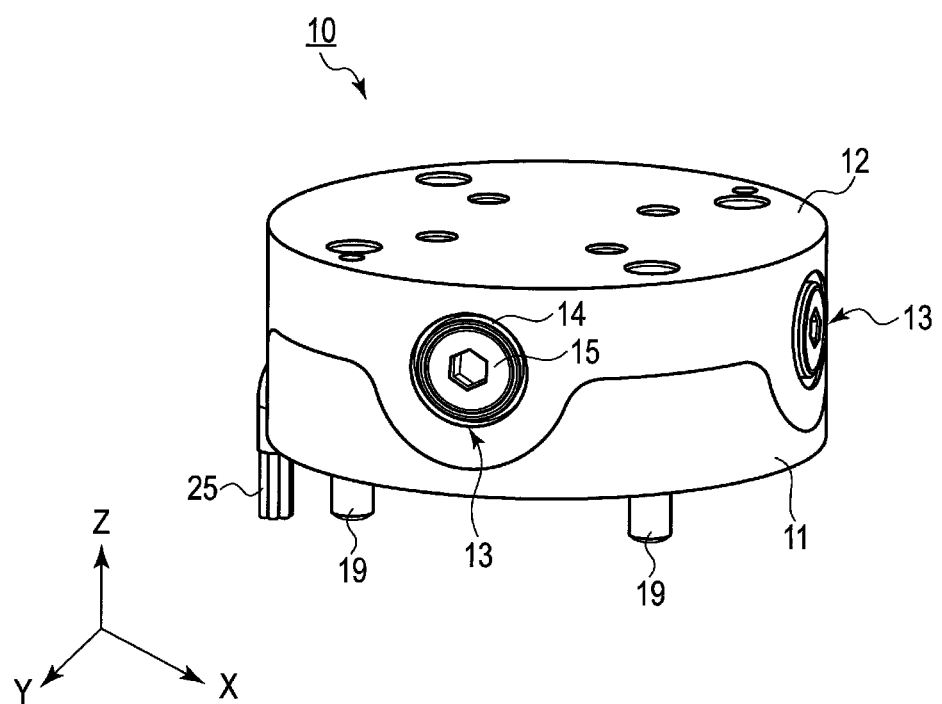
F I G. 11

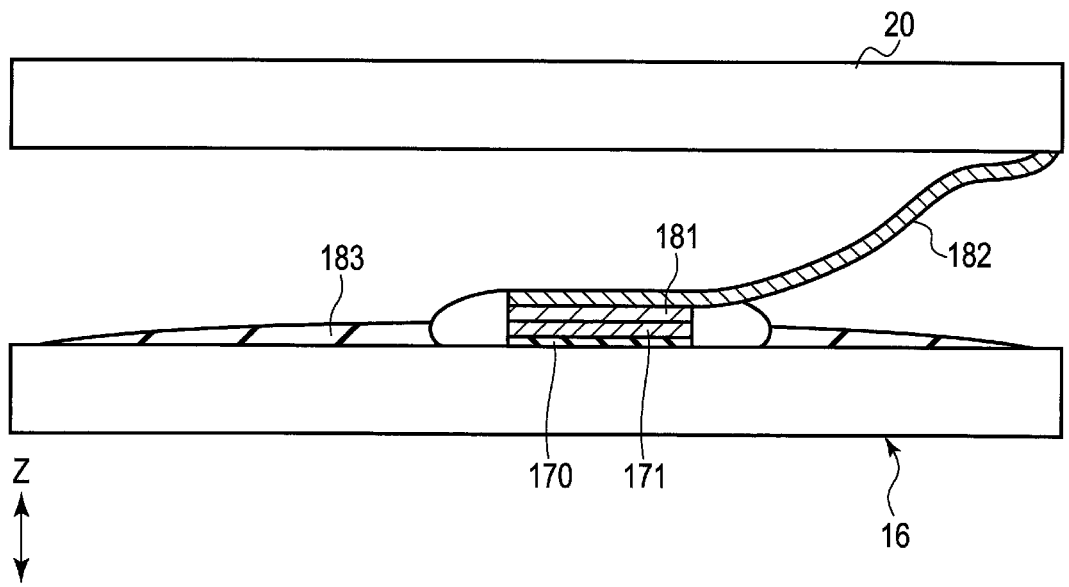
F I G. 13
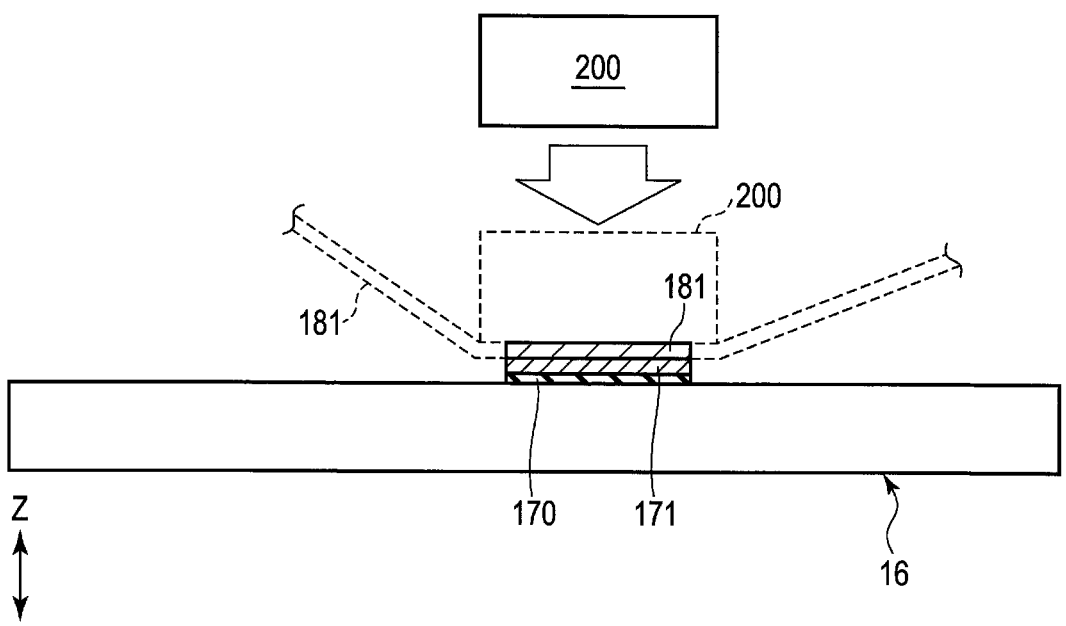
F I G. 14

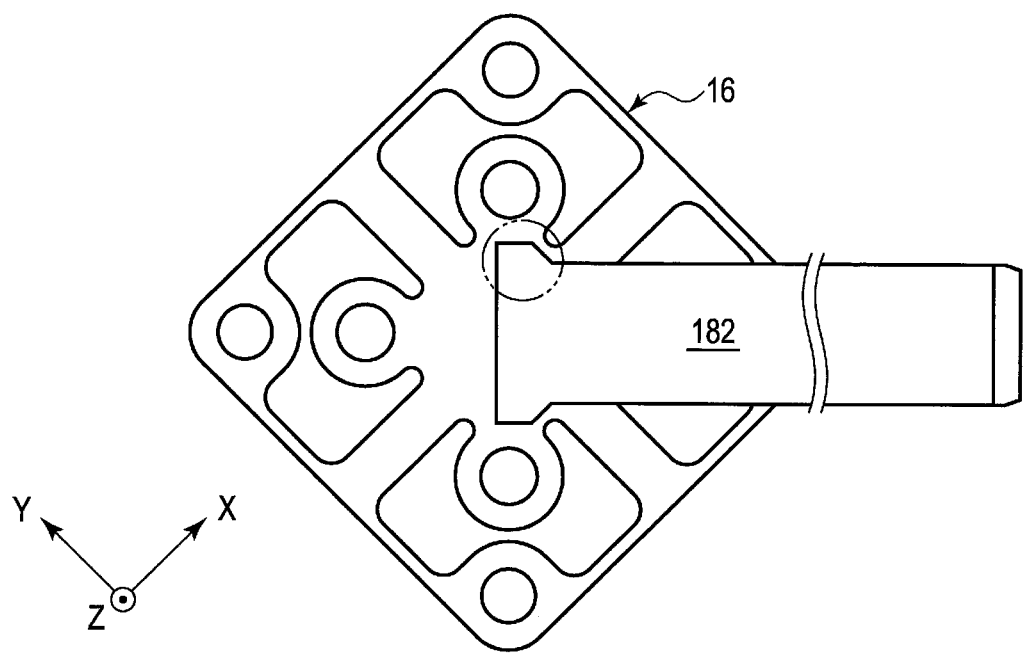
F I G. 15
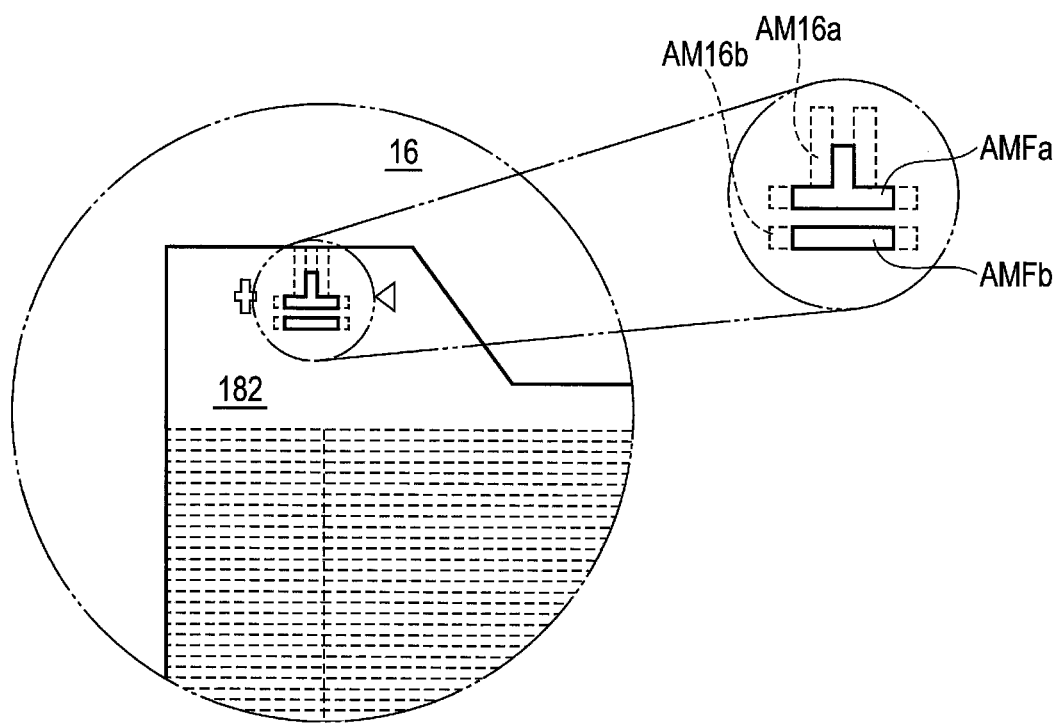
F I G. 16

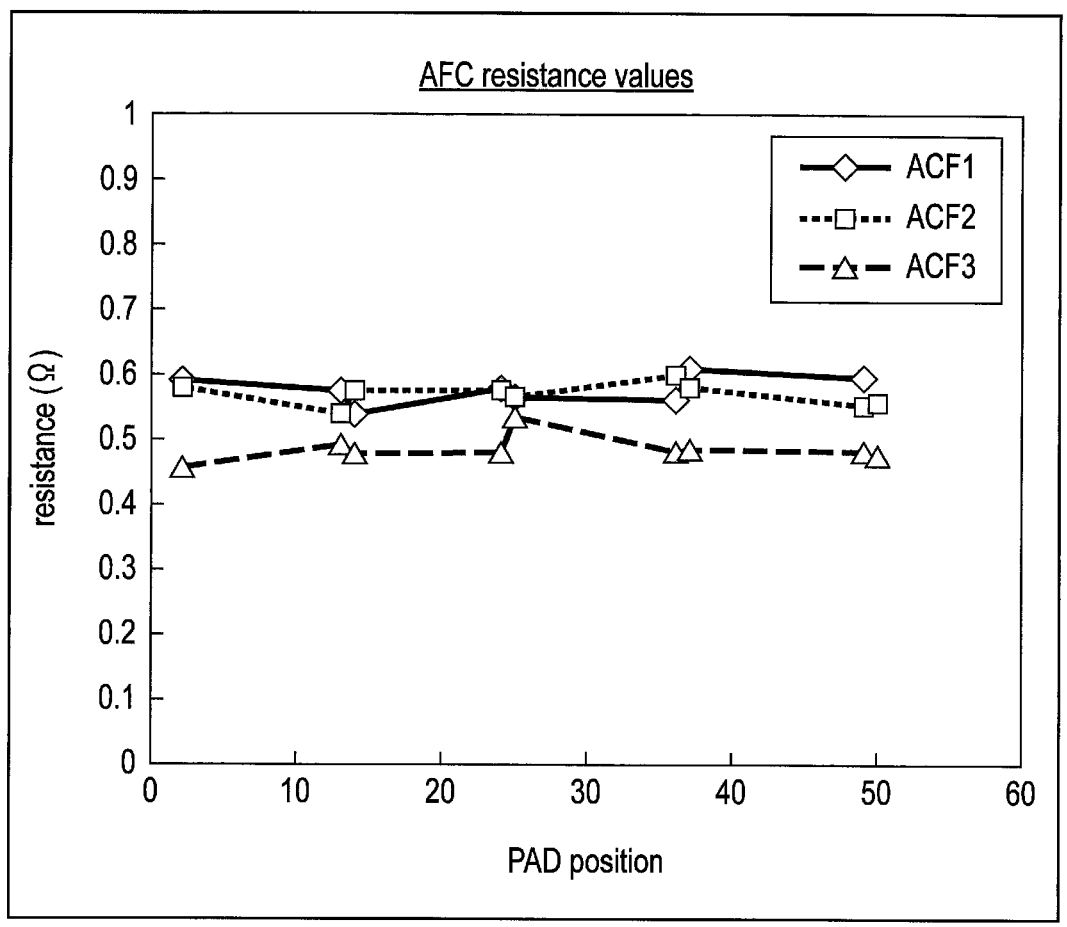
F I G. 18

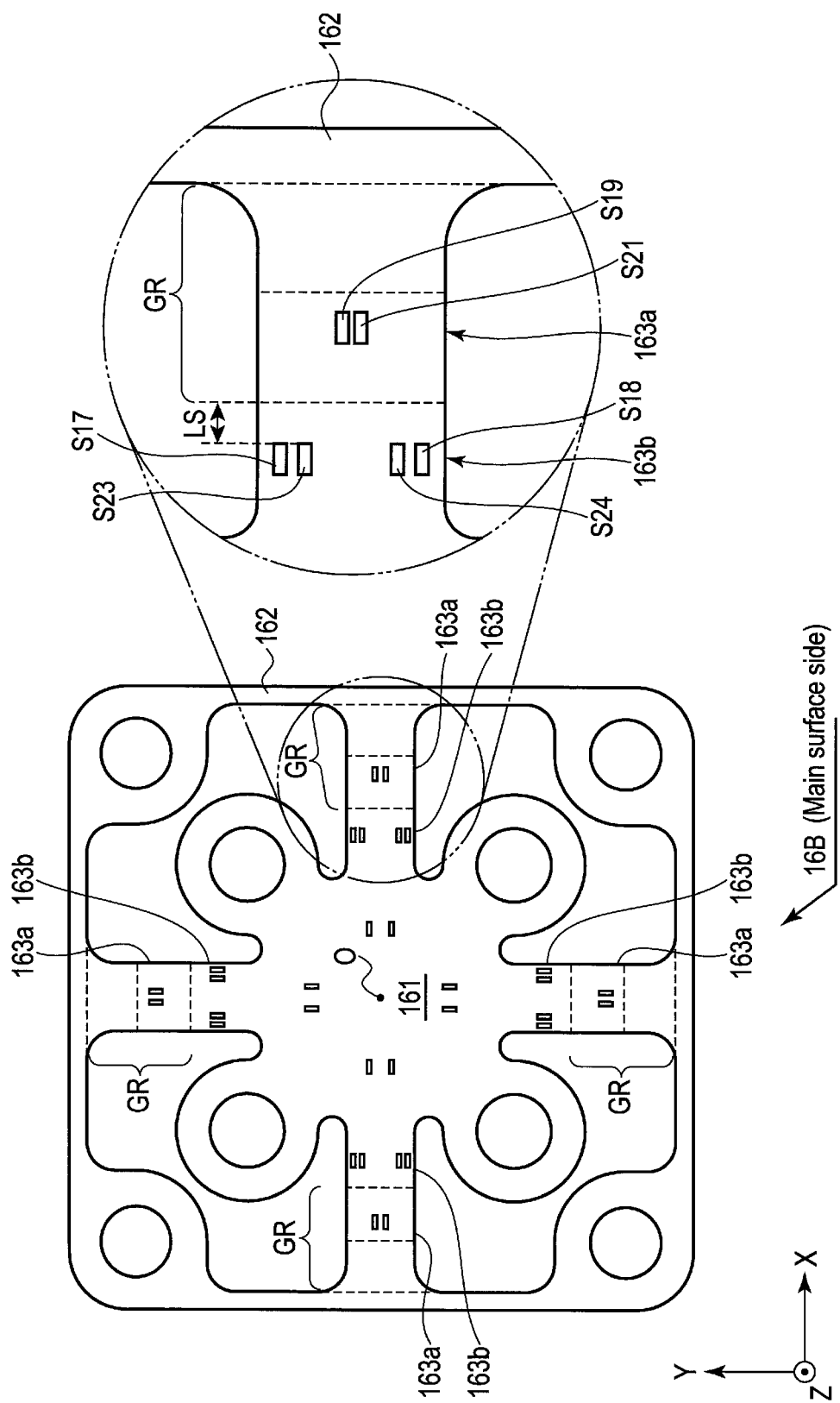
F I G. 19

STRAIN BODY AND FORCE SENSOR PROVIDED WITH THE STRAIN BODY

CROSS-REFERENCE TO RELATED APPLICATIONS

This application is a continuation of International Application No. PCT/JP2017/045159, filed on Dec. 15, 2017, which claims priority to and the benefit of Japanese Patent Application No. 2017-033447, filed on Feb. 24, 2017. The disclosures of the above applications are incorporated herein by reference.

FIELD

The present disclosure relates generally to, for example, a six-axis force sensor, etc., provided with a strain body and applicable to a robot arm.

BACKGROUND

Six-axis force sensors which are used in, for example, robot arms, to detect an external force and torque in X, Y, and Z directions have been known (refer to, for example, Patent Literature 1 (JP 2013-061305 A)).

In such a force sensor, an external force applied to a force receiving body serving as a movable unit is transmitted to a strain body, and deformation of a strain sensor (strain gauge) provided on the strain body is converted into an electric signal and detected.

The range of application of the strain body provided with such a strain sensor tends to extend in accordance with development of computer technologies and information communication technologies of these days, and further downsizing and higher performance of the strain body are required.

However, a distance, i.e., a pitch between electrode terminals to take the detection signal from a strain sensor to the outside has been much narrower in accordance with further downsizing and higher performance of the strain body. For this reason, a normal detection signal cannot be taken to the outside even when the position of the electrode terminal and the position of the terminal of the lead wire to take the detection signal to the outside are slightly shifted. Thus, providing a strain body capable of improving the reliability while securing reliable electric connection between an electrode terminal and a terminal of a lead wire has been difficult.

SUMMARY

Embodiments of the present invention described herein can provide a strain body and a force sensor provided with the strain body, capable of improving reliability while securing reliable electric connection between an electrode terminal and a terminal of a lead wire.

A strain body according to the embodiments includes a central portion; an outer peripheral portion surrounding the central portion; connecting portions connecting the central portion and the outer peripheral portion; strain sensors provided on main surfaces of the connecting portions; reference resistors provided on a main surface of the central portion, and constructing a bridge circuit with the strain sensors; an electrode provided on a main surface of the central portion and electrically connected to the strain sensors and the reference resistors to take a detection signal of the bridge circuit; a lead wire making electric connection between the electrode and the outside; and an anisotropic conductive film provided between the electrode and the lead wire to make electric connection between a terminal of the electrode and a terminal of the lead wire.

According to the embodiments, a strain body and a force sensor provided with the strain body, capable of improving reliability while securing reliable electric connection between an electrode terminal and a terminal of a lead wire can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6 is a figure showing a relationship between a detection circuit and the detected force and moment.

FIG. 7 is a flowchart illustrating at method of manufacturing the strain body according to the first embodiment.

FIG. 11 is a perspective view showing an appearance of a force sensor equipped with the strain body according to the first embodiment.

FIG. 13 is a cross-sectional view showing the strain body in the state of being mounted in the force sensor.

FIG. 14 is a cross-sectional view for illustrating a method of connecting an electrode and a lead wire with an anisotropic conductive film on the strain body in FIG. 13.

FIG. 15 is a plan view showing a state where the strain body and an anisotropic conductive film in FIG. 13 are arranged at predetermined positions.

FIG. 16 is an enlarged plan view showing a portion surrounded by a solid line in FIG. 15.

FIG. 18 is a graph showing a relationship between a position of an electrode pad and resistances of anisotropic conductive films.

FIG. 19 is a plan view showing an overall structure of a strain body according to a fourth embodiment as viewed from its main surface side.

DETAILED DESCRIPTION

Figure 1:
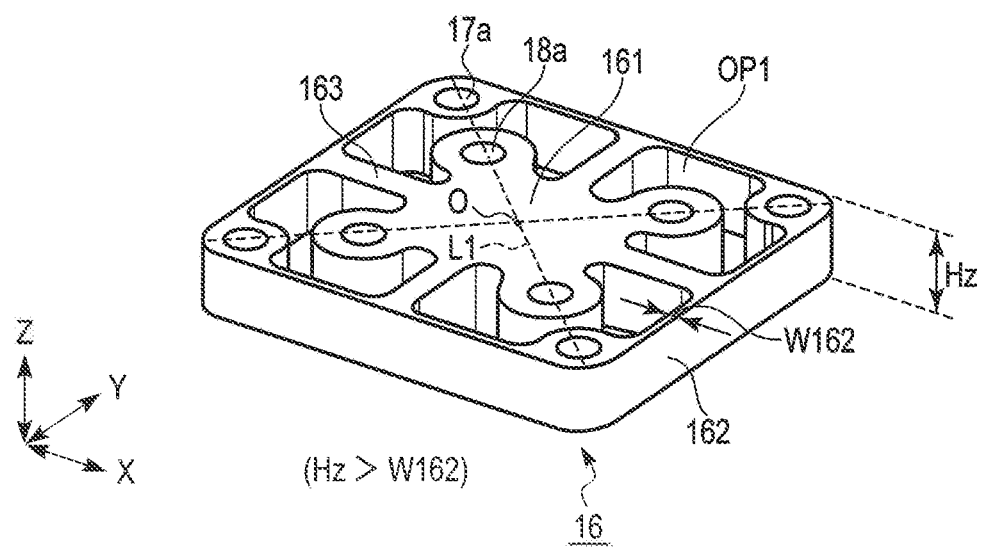
FIG. 1 is a perspective view showing an overall structure of a strain body according to a first embodiment.

Embodiments will be described hereinafter with reference to the accompanying drawings. In the following description, substantially the same functions and elements will be denoted by the same reference numerals, and will be described as necessary. In addition, the drawings are schematic, and the relationship between thicknesses and planar dimensions, the ratio between the thicknesses of layers, etc., may be different from those in reality.

First Embodiment

Structure

Overall Structure

Figure 2:
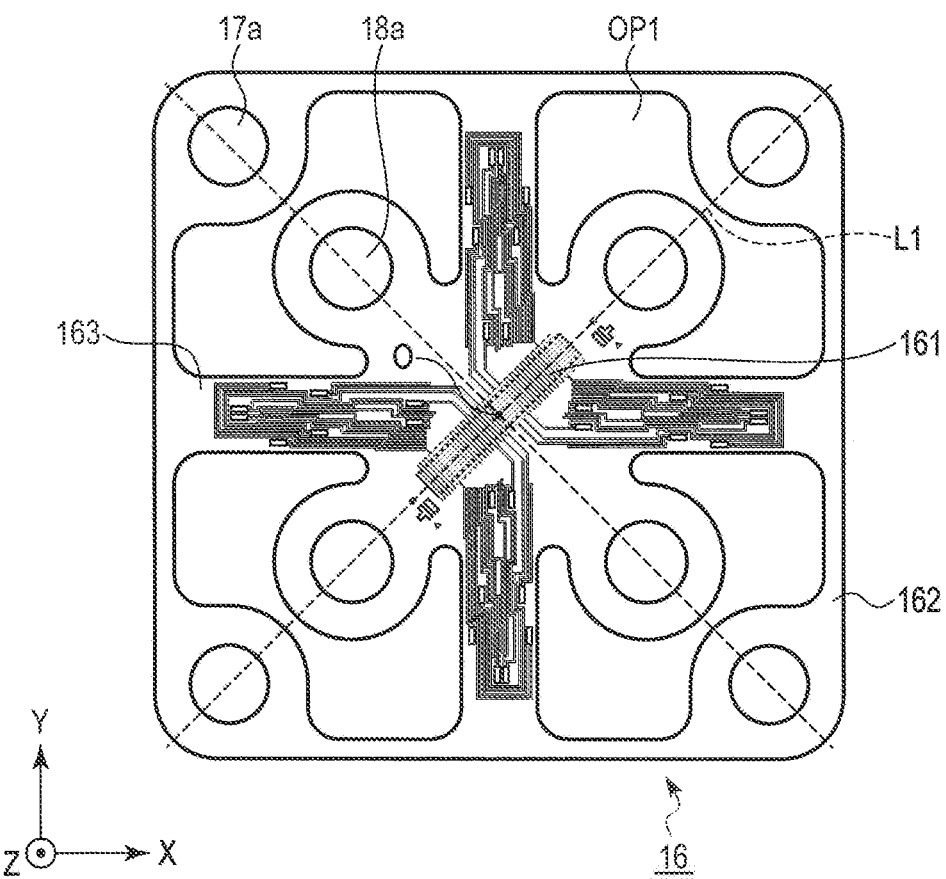
FIG. 2 is a plan view showing a planar structure of the strain body in FIG. 1.

An overall structure of a strain body according to a first embodiment will be described with reference to FIG. 1 and FIG. 2. FIG. 1 is a perspective view showing the whole structure of the strain body according to the first embodiment. FIG. 2 is a plan view showing the planar structure of the strain body in FIG. 1.

As shown in FIG. 1 and FIG. 2, a strain body 16 according to the first embodiment comprises a central portion 161, an outer peripheral portion 162 which surrounds the periphery of the central portion 161, and four connecting portions 163 which connect the central portion 161 and the outer peripheral portion 162. The strain body 16 is formed of, for example, a predetermined metal such as stainless steel.

The central portion 161 includes a center O, which is the intersection of two diagonal lines L1 connecting the corner portions of the outer peripheral portion 162. In addition, a plurality of reference resistors for constructing bridge circuits, which will be described later, are provided in the central portion 161. Four screw holes 18a for fixing a first support member which is an external member are provided in the corner portions of the central portion 161. Each of the screw holes 18a is provided to protrude in a hollow portion OP1 from the center O side to the outside along the directions of the diagonal lines L1 for the purpose of saving space.

Four screw holes 17a for fixing a second support member different from the first support member which is an external member are provided in the corner portions of the outer peripheral portion 162. Each of the screw holes 17a is provided to protrude in the hollow portion OP1 from the outside to the center O side along the directions of the diagonal lines L1 for the purpose of saving space.

Four connecting portions 163 are provided radially from the center O along the X direction or Y direction. A plurality of strain sensors for detecting external force and torque in X, Y, and Z directions, which are not shown in the drawings, are provided in the connecting portions 163. The width of the connecting portions 163 is formed to be approximately the same from the center O side toward the outside.

In addition, since the height Hz of the strain body 16 along the Z direction is common to the central portion 161, the outer peripheral portion 162, and the connecting portions 163, the height is substantially the same. The height Hz of the strain body 16 is formed to be greater than the width W162 of the outer peripheral portion 162 along the X direction or the Y direction (Hz>W162).

Furthermore, the elasticity of the outer peripheral portion 162 and the connecting portions 163 is formed to be greater than the elasticity of the central portion 161. More desirably, the outer peripheral portion 162 and the connecting portions 163 are formed to have an elastic function, and the central portion 161 is formed to have no elastic function. The elastic function means a function of causing elastic deformation with input external force and torque.

More specifically, the amount of strain of the elastic deformation of the central portion 161 is, preferably, less than or equal to $3 \times 10^{-6}$ at a rated load, and more preferably, less than or equal to $1 \times 10^{-6}$. The elastic deformation of the connecting portions (beam portions) 163 is within the elastic limit of a material at a rated load, and the strain amount is, desirably, greater than or equal to $2 \times 10^{-5}$, and more desirably, greater than or equal to $2 \times 10^{-4}$. The elastic deformation of the outer peripheral portion 162 is within the elastic limit of a material at a rated load, and the amount of flexure of the most flexed portion is, preferably, greater than or equal to 20 μm, and more desirably, greater than or equal to 50 μm.

Detailed Structure

Figure 3:
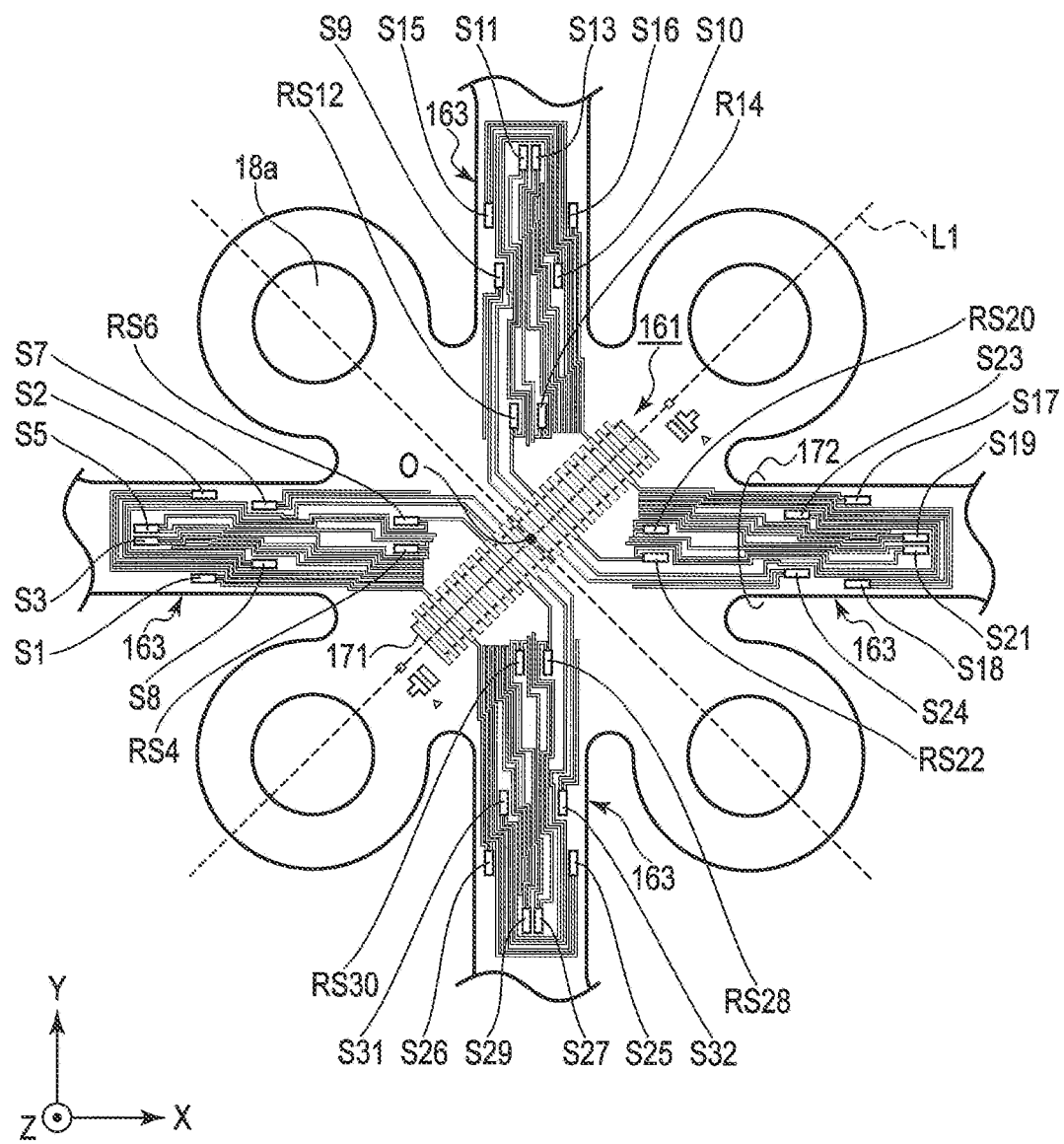
FIG. 3 is a plan view showing details of a central portion and connecting portions as viewed from the main surface side of the strain body in FIG. 1.

The detailed planar structure of the strain body 16 according to the first embodiment will be described with reference to FIG. 3. FIG. 3 is a plan view showing the central portion 161 and the connecting portions 163 from the perspective of the main surface side of the strain body 16, on which the strain sensors, etc., are provided, in detail.

As shown in FIG. 3, twenty-four strain sensors (strain gauges) S1, S2, S3, S5, S7, S8, S9, S10, S11, S13, S15, S16, S17, S18, S19, S21, S23, S24, S25, S26, S27, S29, S31, and S32 are provided on the main surfaces of the connecting portions 163. The strain sensors S1 to S32 are metallic thin-film resistive elements as described later and are, for example, resistive elements (Cr—N resistive elements) including chromium (Cr) and nitrogen (N). For this reason, the plurality of strain sensors S1 to S32 can be disposed at desired positions only by patterning as described later. In addition, since the temperature coefficients of the Cr—N resistive elements are small, temperature compensation can easily be made. The longitudinal direction of the strain sensors S1 to S32 is made to coincide with the X direction or the Y direction.

Eight reference resistors RS4, RS6, RS12, RS14, RS20, RS22, RS28, and RS30 are provided on the main surface of the central portion 161. The shape and material of the reference resistors RS4 to RS30 are substantially the same as those of the strain sensors S1 to S32, and their longitudinal direction is made to coincide with the X direction or the Y direction. Moreover, an electrode 171 is provided along one of the directions of the diagonal lines L1 of the central portion 161, on the main surface of the central portion 161.

A wire 172 is arranged on the main surface such that the strain sensors and the reference resistors construct four bridge circuits as described later and that the strain sensors construct four full-bridge circuits as described later. The wire 172 is electrically connected to a predetermined terminal of the electrode 171. The line width of the wire 172 is formed to be smaller at portions connecting the strain sensors S1 to S32 and the reference resistors RS4 to RS30 and to be larger than the connecting portions to reduce the line resistance at the other portions.

Moreover, the strain sensors S1 to S32, the reference resistors RS4 to RS30, the electrode 171, and the wire 172 are integrally formed on the main surface of the strain body 16 by a manufacturing method employing a thin-film technique as described later. For this reason, the strain sensors S1 to S32, the reference resistors RS4 to RS30, the electrode 171, and the wire 172 are formed in a layout of being symmetrical on both sides of the diagonal lines L1 of the strain body 16.

Figure 4:
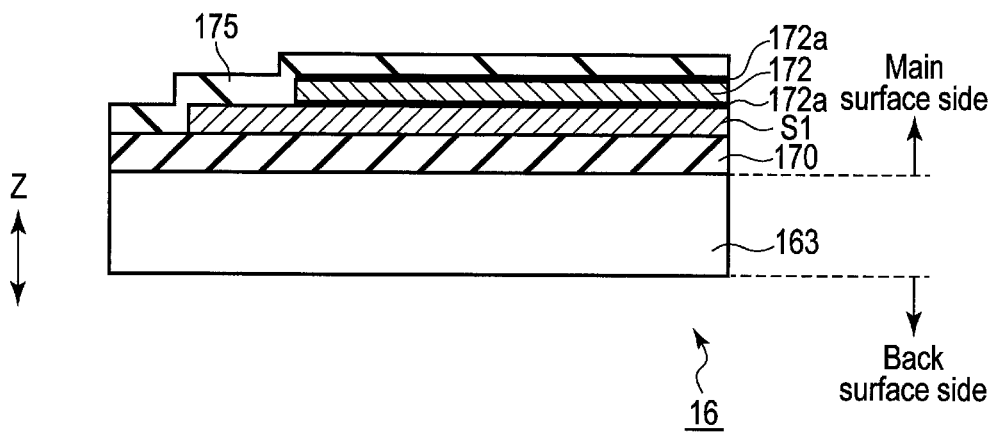
FIG. 4 is a cross-sectional view of the connecting portion including a strain sensor in FIG. 3.

The detailed cross-sectional structure of the strain body 16 will be described with reference to FIG. 4. FIG. 4 is a cross-sectional view of the connecting portion 163 including the strain sensor S1 in FIG. 3.

As shown in FIG. 4, an insulating film 170 is provided on the main surface of the connecting portion 163. The strain sensor S1, which is a Cr—N resistive element serving as a strain sensitive film, is provided on the insulating film 170. The wire 172, which is an electrode lead film formed of copper (Cu), is provided on the strain sensor S1. An overglass (OG) film 175 is provided so as to cover the strain sensor S1 and the wire 172. In addition, an adhesive film 172a containing chromium (Cr) to improve adhesion is provided on the interface between the wire 172 and the strain sensor S1 and the interface between the wire 172 and the OG film 175.

The electrode 171 connected to the wire 172 at the central portion 161 is formed of a multilayer structure of copper (Cu) and gold (Au) sequentially provided on an adhesive film 172a, though not illustrated in the cross-section.

Bridge Circuits and Full-Bridge Circuits

Figure 5:
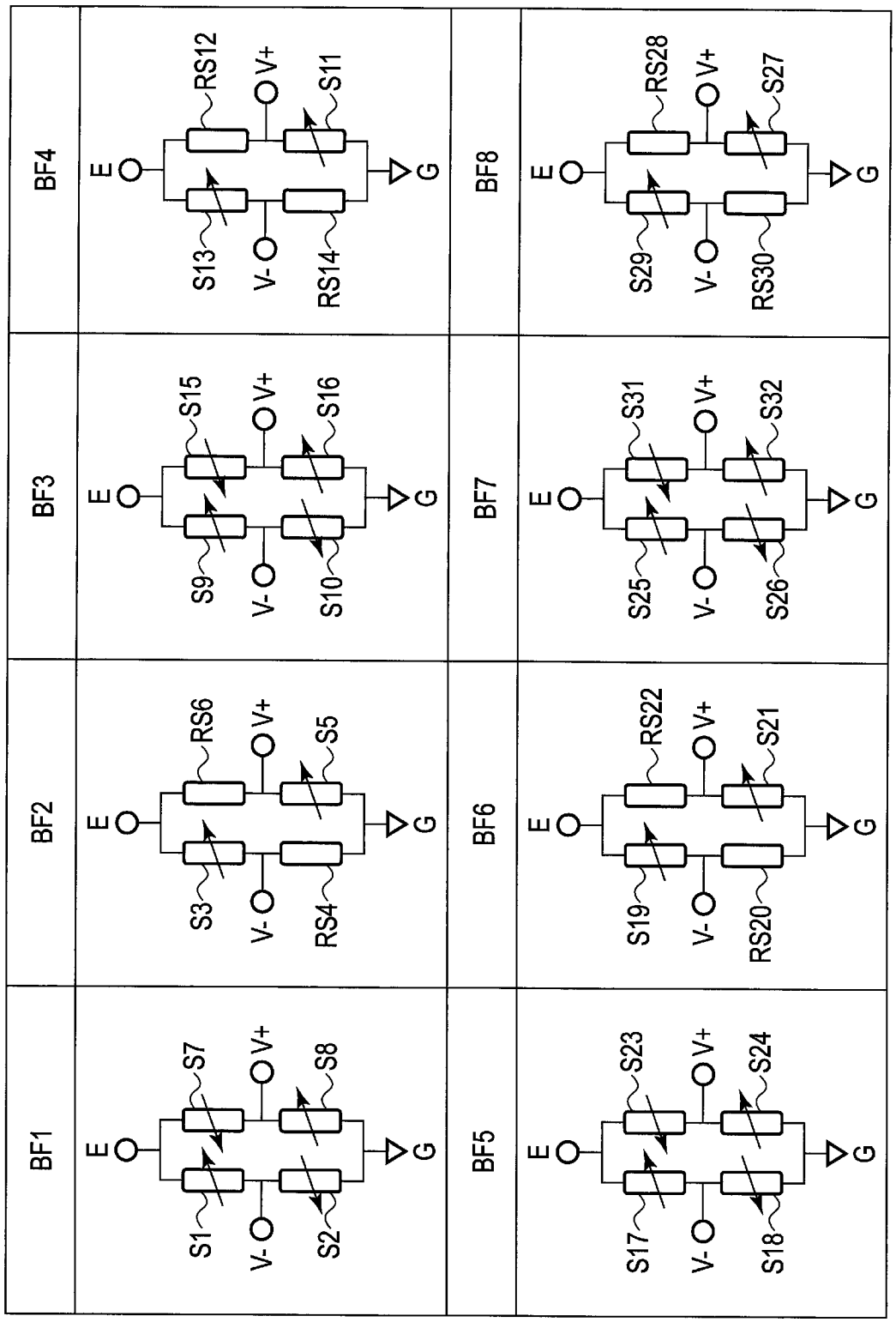
FIG. 5 is a circuit diagram illustrating bridge circuits and full-bridge circuits of the strain body according to the first embodiment.

FIG. 5 is a circuit diagram showing bridge circuits and full-bridge circuits of the strain body 16 according to the first embodiment.

As shown in FIG. 5, the strain body 16 comprises four bridge circuits BF2, BF4, BF6, and BF8 and four full-bridge circuits BF1, BF3, BF5, and BF7.

The bridge circuit BF2 comprises two strain sensors (first strain sensors) S3 and S5 and two reference resistors RS4 and RS6. The strain sensor S3 and the reference resistor RS4 are connected in series, and the reference resistor RS6 and the strain sensor S5 are connected in series, between the power supply terminal E and the ground G. The strain sensor S3 and the reference resistor RS4, which are connected in series, and the reference resistor RS6 and the strain sensor S5, which are connected in series, are connected in parallel between a power supply terminal E and a ground G. A terminal V− is connected to a connection between the strain sensor S3 and the reference resistor RS4. The other terminal V+ is connected to a connection between the reference resistor RS6 and the strain sensor S5. The other bridge circuits BF4, BF6, and BF8 also are constructed similarly to the bridge circuit BF2.

The full-bridge circuit BF1 is composed of four strain sensors (second strain sensors) S1, S2, S7, and S8. The strain sensor S1 and the strain sensor S2 are connected in series, and the strain sensor S7 and the strain sensor S8 are connected in series, between the power supply terminal E and the ground G. The strain sensors S1 and S2, which are connected in series, and the strain sensors S7 and S8, which are connected in series, are connected in parallel between the power supply terminal E and the ground G. A terminal V− is connected to a connection between the strain sensors S1 and S2. The other terminal V+ is connected to a connection between the strain sensors S7 and S8. The other full-bridge circuits BF3, BF5, and BF7 are constructed similarly to the full-bridge circuit BF1.

In the above-described structure, when the force and torque (moment) are applied from the outside to the strain body 16, the position of the central portion 161 changes relatively to the position of the outer peripheral portion 162, and the connecting portions 163 are thereby deformed in accordance with the force and torque. In accordance with the deformation of the connecting portions 163, stress is applied to each of the strain sensors S1 to S32 provided in the connecting portions 163, and the balance of the voltages of the terminals V− and V+ of each of the bridge circuits and each of the full-bridge circuits is lost, and a predetermined detection signal corresponding to the force and torque is detected.

In addition, FIG. 6 is a figure showing a relationship between a detection circuit and the detected force and moment. As shown in FIG. 6, the full-bridge circuits BF3 and BF7 detect force Fx in the X direction and moment Mz in the Z direction. The full-bridge circuits BF1 and BF5 detect force Fy in the Y direction and moment Mz in the Z direction. The bridge circuits BF2 and BF6 detect force Fz in the Z direction and moment My in the Y direction. The bridge circuits BF4 and BF8 detect force Fz in the Z direction and moment Mx in the X direction. The above-described structure enables the six-axis force and torque to be detected.

[Manufacturing Method]

FIG. 7 is a flowchart for explanation of the method of manufacturing the strain body 16 according to the first embodiment.

As shown in FIG. 7, the strain body 16 is first subjected to a test of the dimensions or the like, a predetermined test is preformed, and then, pretreatment is performed for the strain body 16 (B1). The pretreatment includes, for example, washing treatment of the main surface of the strain body 16 after the test with ultrasonic waves, a predetermined agent, and the like.

Then, the insulating film 170 is formed on the main surface of the strain body 16 after the pretreatment by, for example, a thermal oxidation method (B2).

Then, for example, the strain body 16 is subjected to heat treatment such as a predetermined annealing treatment, such that properties such as an insulation property, of the formed insulating film 170, are improved (B3).

Then, a Cr—N thin film containing chromium (Cr) and nitrogen (N) is formed on the insulating film 170 by, for example, a sputtering using a predetermined target. Moreover, a photoresist is coated on the formed Cr—N thin film, and the coated photoresist is subjected to patterning. More specifically, a pattern having the same planar shape as that of the reference resistors RS4 to RS30 is transferred to the photoresist at the position where the reference resistors RS4 to RS30 of the central portion 161 are disposed, the pattern having the same planar shape as the strain sensors S1 to S32 is transferred to the photoresist at the position where the strain sensors S1 to S32 of the connecting portion 163 are disposed, and the photoresist other than the portions where these patterns are transferred is removed by development. Furthermore, etching is performed to the surface of the insulating film 170 using the photoresist on which the pattern is developed as a mask, and the reference resistors RS4 to RS30 and the strain sensors S1 to S32 having desired shapes are thereby formed at predetermined positions on the central portion 161 and the connecting portion 163 (B4).

Subsequently, an adhesive film 172a of a chromium (Cr) thin film for enhancing adhesion is formed on the central portion 161 and the connecting portion 163 using, for example, the same manufacturing process as step B4, etc. An electrode lead film containing copper (Cu) is formed on the adhesive film 172a, and a wire 172 for electric connection between the strain sensors S1 to S32 and the reference resistors RS4 to RS30 is formed. Furthermore, an adhesive film 172a composed of chromium thin film is formed on the wire 172 by the same manufacturing process as the above-described step (B5).

Subsequently, an electrode 171 serving as an electrode film is formed in a direction along the direction of one diagonal line L1, on the adhesive film 172a at the end part of the wire 172 in the central portion 161, as shown in FIG. 3. The electrode 171 is formed by sequentially forming a stacked structure composed of copper (Cu) and gold (Au) by using, for example, the same manufacturing process as step B4 (B6).

Subsequently, the OG film 175 is formed on the main surface of the strain body 16 except on the electrode 171 by using, for example, a Chemical Vapor Deposition (CVD) method (B7).

Subsequently, the strain sensors S1 to S32 and the like formed on the main surface of the strain body 16 are subjected to strain properties inspection, stress inspection and the like, to confirm the characteristics required for the strain sensors S1 to S32 and the like (B8).

The strain body 16 according to the first embodiment is manufactured by the above manufacturing method.

[Functions and Advantages]

As described above, the strain body 16 according to the first embodiment is provided on the main surface of the central portion 161 substantially free from distortion, and comprises a plurality of reference resistors RS4 to RS30 constructing the bridge circuits BF2, BF4, BF6, and BF8 together with the plurality of strain sensors S1 to S32 (FIG. 3). Thus, the reference resistors RS4 to RS30 are integrally provided on the main surface of the same strain body 16 as the strain sensors S1 to S32. As a result, the influence of the temperature error and the external noise generated between the strain sensors S1 to S32 and the reference resistors RS4 to RS30 can be reduced, and the detection accuracy can be improved.

Moreover, the strain body 16 according to the first embodiment is provided on the main surface of the connecting portion 163, and comprises the full bridge circuits BF2, BF4, BF6, and BF8 in which a pair of serially connected strain sensors (second strain sensors) are connected in parallel (FIG. 5). For this reason, the sensitivity of the strain body 16 can be improved, and the detection accuracy can be improved. For example, in the case of the strain body 16 according to the first embodiment, since a half of the entire detection circuit is composed of the full bridge circuits BF2, BF4, BF6, and BF8, the sensitivity and detection accuracy can be improved up to approximately twice as compared to the case where all the detection circuits are composed of bridge circuits.

In addition, the layout of the strain sensors S1 to S32, the reference resistors RS4 to RS30, the electrodes 171, and the wire 172 is formed symmetrically about the diagonal line L1 of the strain body 16. Furthermore, since the width of the connecting portion 163 is formed to be substantially the same from the center O side to the outer side, space to arrange the strain sensors S1 to S32 can be extended as compared to a configuration in which the width decreases from the center O to the outer side (FIG. 3). Thus, the strain body 16 according to the first embodiment has an optimum configuration for arranging the strain sensors S1 to S32 and the like in a limited space on the main surface of the central portion 161 and the connecting portion 163.

Furthermore, the strain sensors S1 to S32, the reference resistors RS4 to RS30, the electrode 171, and the wire 172 are provided only on the main surface of strain body 16 by a manufacturing method using the thin film technology (FIG. 4 and FIG. 7). For this reason, high sensitivity sensors S1 to S32 can be provided at the connecting portion 163 of the strain body 16 with high density and high accuracy. Therefore, a large number of (for example, approximately ninety) strain sensors do not need to be arranged to compensate for the detection accuracy, and the strain sensors do not need to be applied on not only the surface of the strain body but also, for example, the side surfaces of the strain body, by using an adhesive or the like. For example, when the manufacturing method similar to the present embodiment is not used, the position of the strain sensor may cause an error of approximately several hundreds of μm from the desired position. For this reason, influence of multiaxial interference in which forces and torques other than the specific axis are detected increases. In addition, for example, when the reference resistors are provided outside the strain body, the temperature error and the external noise also need to be corrected since the temperature error and the external noise increase. In the present embodiment, however, such a problem does not occur.

In addition, the height Hz of the strain body 16 along the Z direction is substantially the same in the central portion 161, the outer peripheral portion 162, and the connecting portion 163. The height Hz of the strain body 16 is formed to be greater than the width W162 of the outer peripheral portion 162 along the X direction or the Y direction (Hz>W162). Furthermore, the elasticity of the outer peripheral portion 162 and the connecting portions 163 is formed to be greater than the elasticity of the central portion 163. More desirably, the outer peripheral portion 162 and the connecting portion 163 are configured to have an elastic function and not to have the elastic function of the central portion 163. The above-described structure enables each output gain and each rigidity of the XYZ axes to be adjusted more appropriately.

Second Embodiment

Figure 8:
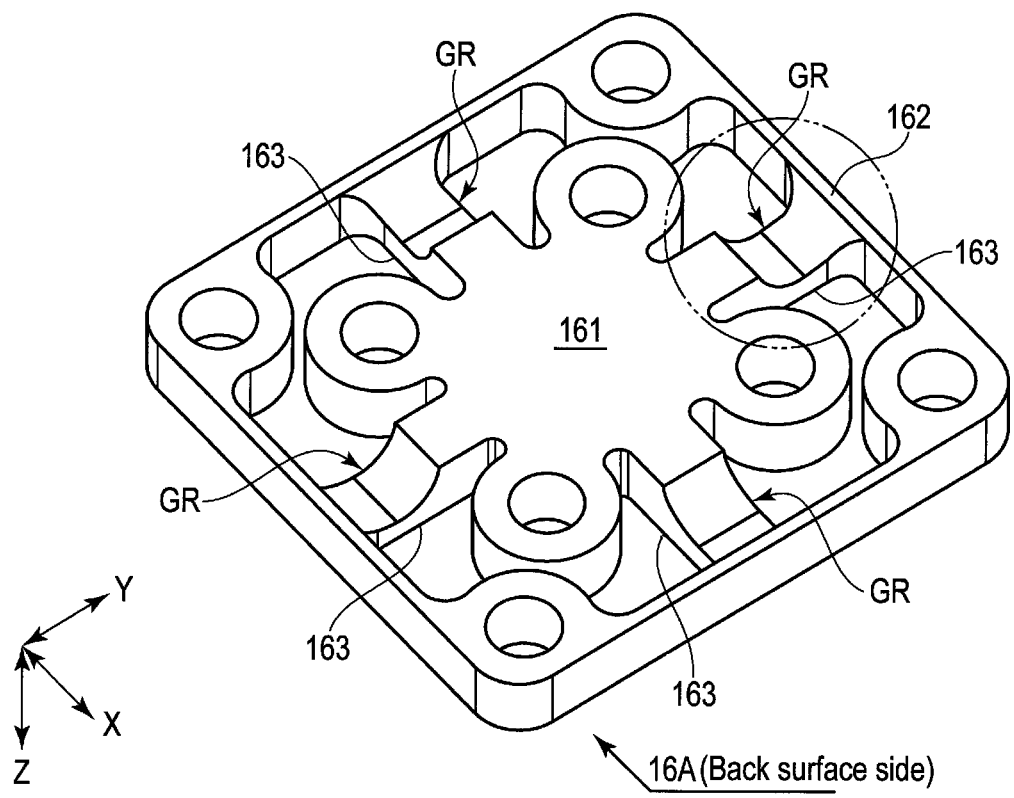
FIG. 8 is a perspective view showing an overall structure of a strain body according to a second embodiment as viewed from its back side.
Figure 9:
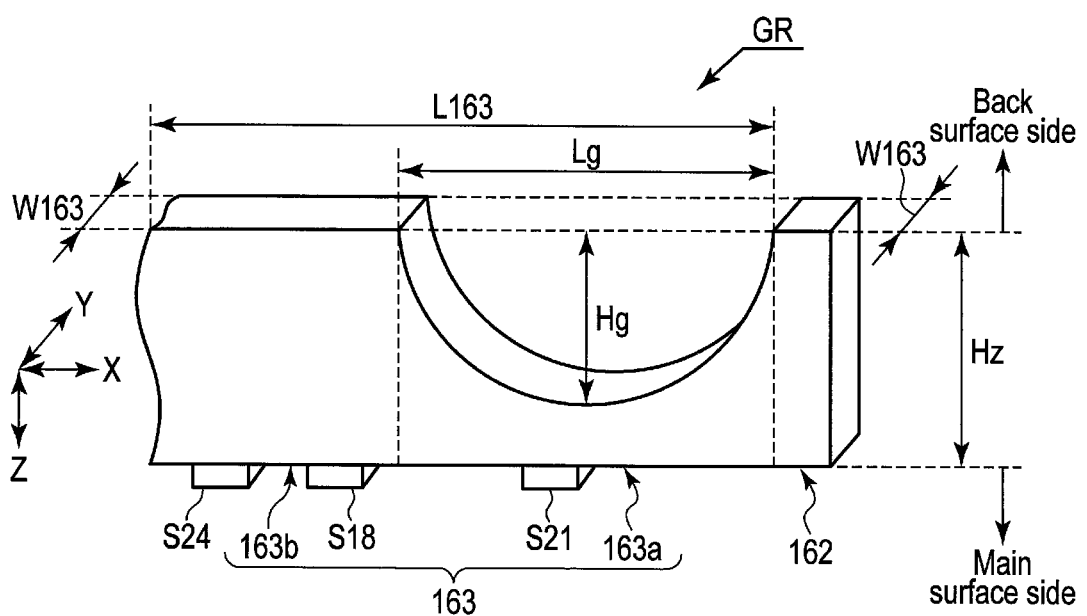
FIG. 9 is an enlarged perspective view showing a strain increasing portion surrounded by a broken line in FIG. 8.

Example of Providing a Strain Increasing Portion at a Connecting Portion on Back Surface Side of Strain Body A strain body 16A according to a second embodiment will be described with reference to FIG. 8 to FIG. 10. In a second embodiment, the back surface side of the connecting portion of the strain body 16A comprises a groove (groove structure) GR as a strain increasing portion for increasing strain. FIG. 8 is a perspective view showing an overall structure of a strain body 16A according to a second embodiment as viewed from its back side. FIG. 9 is an enlarged cross-sectional view showing a strain increasing portion surrounded by a broken line in FIG. 8.

As shown in FIG. 8 and FIG. 9, the connecting portion 163 of the strain body 16A according to the second embodiment comprises a first connecting portion 163a adjacent to the outer peripheral portion 162 and a second connecting portion 163b adjacent to the central portion 161. The first connecting portion 163a is provided on the back surface side with a strain increasing portion GR for increasing the strain generated more than the second connecting portion 163b. That is, the strain increasing portion GR is configured such that the strain generated in the first connection portion 163a is larger than the strain generated in the second connecting portion 163b. The strain increasing portion GR is a groove formed in a substantially U shape, at a part of the back surface side of the first connecting portion 163a. More specifically, since the groove is formed such that its thickness becomes larger from the center of the groove toward the outer peripheral portion 162 and the central portion 161, the first connecting portion 163a is shaped in an arch which is recessed in the thickness direction (Z direction) of the strain body 16.

The height Hg from the back surface of the strain increasing portion GR and the length Lg of the first connecting portion 163a can be appropriately set under conditions that the first connecting portion 163a is not plastically deformed when force and torque are applied. The height Hg of the strain increasing portion GR from the back surface is, desirably, for example, approximately 30% or more and 60% or less of the height Hz of the strain body 16. The length Lg of the strain increasing portion GR is, desirably, for example, approximately 30% or more and 70% or less of the entire length L163 of the connecting portion 163. The width W163 of the connecting portion 163 is the same in the first and second connecting portions 163a and 163b.

In addition, eight strain sensors (first strain sensors) S21 and the like that construct the bridge circuit are provided in the first connecting portion 163a. The second connecting portion 163b is provided with sixteen strain sensors (second strain sensors) S18, S27, and the like that construct the full bridge circuit. The details will be explained in detail with reference to FIG. 10.

Figure 10:
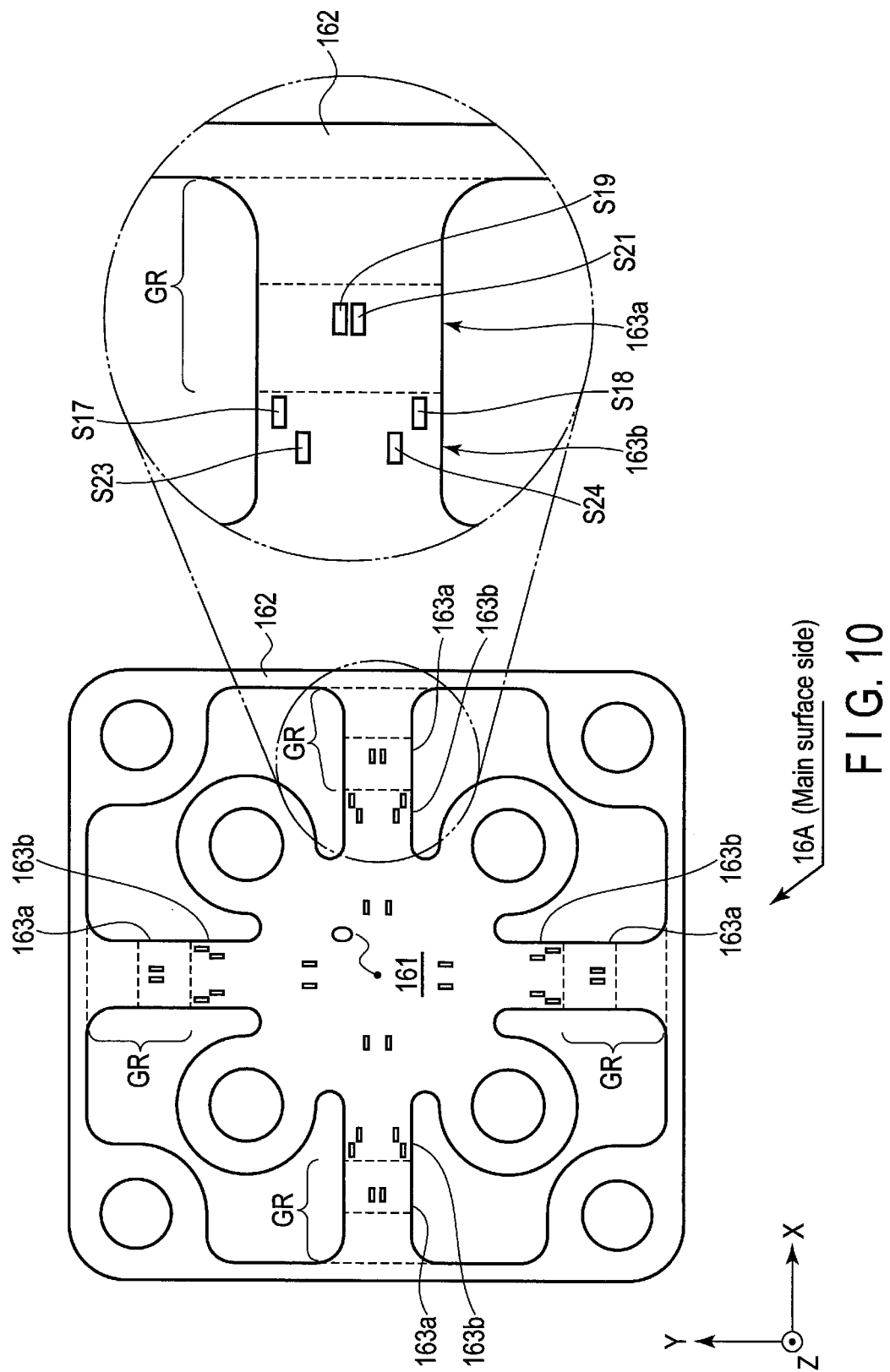
FIG. 10 is a plan view showing an overall structure of a strain body according to a second embodiment as viewed from its main surface side.

FIG. 10 is a plan view showing an overall structure of the strain body 16A according to the second embodiment as viewed from its main surface side. In FIG. 10, illustration of the electrode, the wire, and the like is omitted.

In FIG. 10, as shown by enlarging a portion surrounded by a broken line, eight strain sensors (first strain sensors) S3, S5, S11, S13, S19, S21, S27, and S29 constructing the bridge circuits BF2, BF4, BF6, and BF8 are provided at the first connecting portion 163a. The strain sensors S19 and S21 alone are illustrated in FIG. 10.

In the second connecting portion 163b, sixteen strain sensors (second strain sensors) S1, S2, S7, S8, S9, S10, S15, S16, S17, S18, S23, S24, S25, S26, S31, and S32 which construct the full bridge circuits BF1, BF3, BF5, and BF7 are provided. Eight strain sensors S1, S2, S15, S16, S17, S18, S25, and S26, of the second strain sensors provided in the second connecting portion 163b, are arranged adjacent to the grooves GR as compared with the other second strain sensors. For this reason, in the second strain sensors S1 and the like, too, the strain amount is increased and the sensor sensitivity is increased, similarly to the first strain sensor provided in the first connecting portion 163a.

Since the other structure is substantially the same as that of the first embodiment, their detailed descriptions will be omitted. In addition, the operations are also substantially the same as those in the first embodiment, and a detailed description thereof is omitted.

[Functions and Advantages]

According to the structure and the operation of the strain body 16A of the second embodiment, at least similar functions and advantages as those of the first embodiment can be obtained.

Furthermore, the strain body 16A according to the second embodiment further comprises the strain increasing portion GR for increases the generated strain generated more than the second connecting portion 163b adjacent to the central portion 161, on the back surface side of each first connecting portion 163a adjacent to the outer peripheral portion 162. The strain increasing portion GR is a U-shaped groove provided at a part of the back surface of the first connecting portion 163a (FIG. 8 and FIG. 9).

In the above-described structure, since the thickness of the first connecting portion 163a provided with the strain increasing portion GR is smaller than the thickness of the second connecting portion 163b, the amount of deformation of the first connecting portion 163a can be increased as compared to the amount of deformation of the second connecting portion 163a, when force and torque are applied from the outside to the strain body 16A.

Eight first strain sensors S3 and the like provided in the first connecting portions 163a construct four bridge circuits BF2, BF4, BF6, and BF8 together with eight reference resistors RS4 and the like (FIG. 10). For this reason, according to the strain body 16A according to the second embodiment, the detection accuracy of four bridge circuits BF2, BF4, BF6, and BF8 can be further improved by increasing the strain amount of the eight first strain sensors S3 and the like provided in the first connecting portion 163a.

Moreover, eight strain sensors S1, S2, S15, S16, S17, S18, S25, and S26, of the second strain sensors provided in the second connecting portion 163b, are arranged adjacent to the grooves GR as compared with the other second strain sensors. For this reason, the strain amount is increased in the second strain sensors S1 and the like, similarly to the first strain sensors provided in the first connecting portion 163a. Therefore, the detection accuracy of the four full bridge circuits BF1, BF3, BF5, and BF7 constructed by the eight strain sensors S1 and the like can be further improved. As a result, the detection accuracy in all the six axial directions related to the force and torque in the XYZ-axis directions can be improved.

For example, when force Fz in the Z-axis direction is applied to the strain body 16A according to the second embodiment, the strain amount of the eight strain sensors S3 and the like provided in the first connecting portion 163a can be increased by approximately 50% as compared with the strain sensors S3 and the like according to the first embodiment. Therefore, the desired detection accuracy can be obtained by employing the strain body 16A according to the second embodiment as needed.

Third Embodiment

Example of Application to Force Sensor

A third embodiment will be described with reference to FIG. 11 to FIG. 18. The third embodiment relates to an example of application of the strain body 16 according to the first embodiment to a force sensor. The force sensor according to the third embodiment is used in, for example, a robot arm, and is a six-axis force sensor for detecting force and torque in X, Y, and Z directions.

[Structure]

Figure 12:
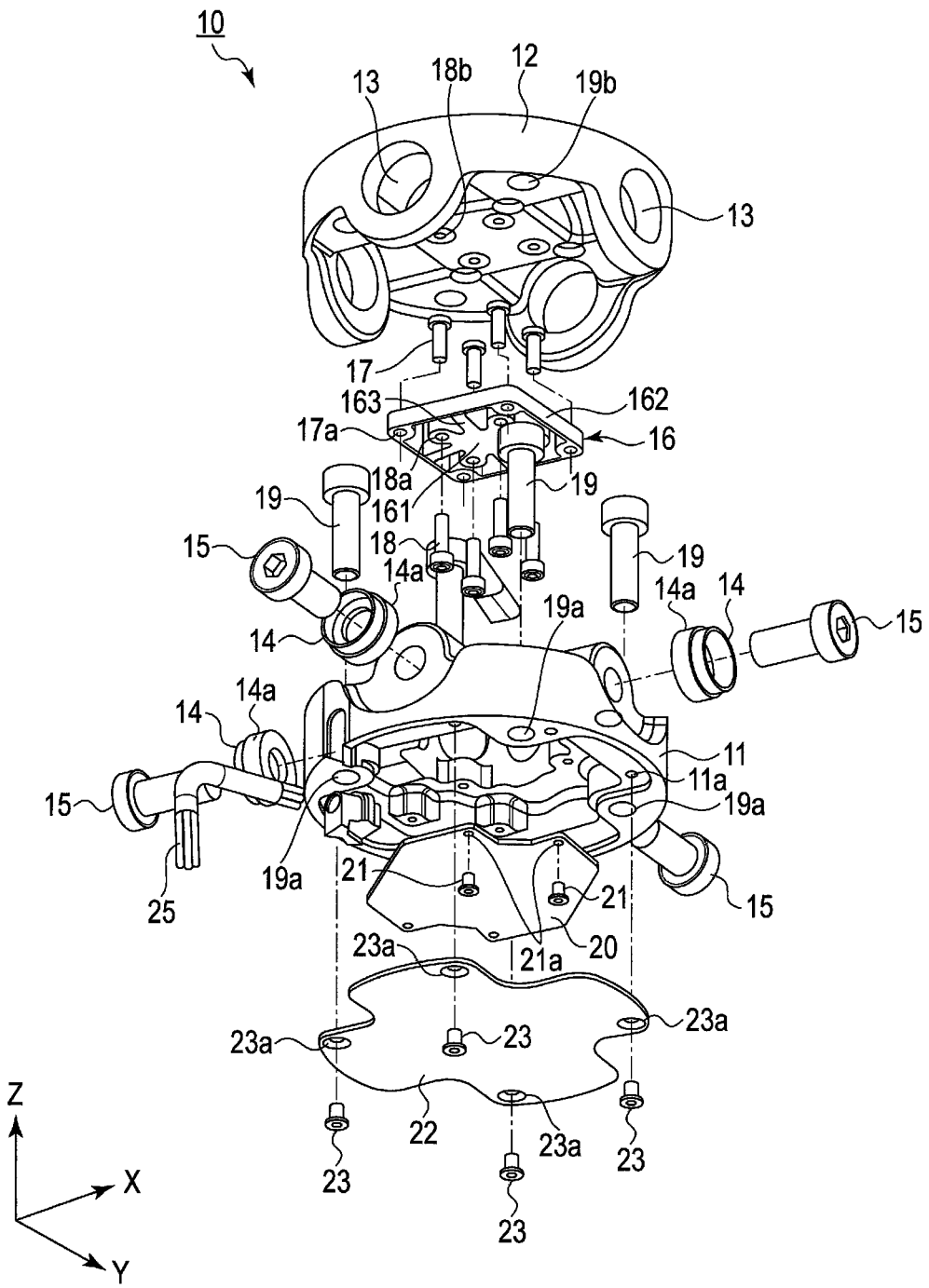
FIG. 12 is an exploded perspective view of the force sensor in FIG. 11.

FIG. 11 is a perspective view showing an appearance of a force sensor 10 provided with the strain body 16 according to the first embodiment. FIG. 12 is an exploded perspective view showing the force sensor 10 in FIG. 11.

As shown in FIG. 11 and FIG. 12, the force sensor 10 comprises a cylindrical main body 11 and a cylindrical movable body 12 which is movable with respect to the main body 11. The main body 11 is fixed to a main body of a robot arm not shown in the figures with a plurality of screws 19 inserted in a plurality of screw holes 19a formed in the bottom of the main body 11. The movable body 12 functions as a hand mounting plate for mounting a hand portion of the robot art not shown in the figures on its top surface.

The main body (base) 11 is a base member serving as the main body of the force sensor 10, and the movable body 12 is mounted so as to be movable in six-axis directions (an X-axis direction, a Y-axis direction, a Z-axis direction, and directions of rotation around the axes) with respect to the main body 10 with the strain body 16, which is elastically deformable, interposed therebetween.

That is, as shown in FIG. 12, a central portion 161 of the strain body 16 is fixed to the movable body (first support member) 12 with a plurality of screws 18 inserted in screw holes 18a. An outer peripheral portion 162 of the strain body 16 is fixed to the main body 11 (second support member) with a plurality of screws 17 inserted in screw holes 17a.

The main surface and the back surface of the strain body 16 are disposed in parallel to a plane formed by the X axis and the Y axis, and a line perpendicularly passing through a center O of the strain body 16 corresponds to the Z axis. In the above-described structure, when external force is applied to the movable body 12, the movable body 12 moves, and connecting portions 163 of the strain body 16 are deformed. As described above, strain sensors S1 to S32 are provided in the connecting portions 163 of the strain body 16, and the deformation of the strain body 16 is thereby detected as an electrical signal by the strain sensors S1 to S32.

For example, four circular opening portions 13 are provided at regular intervals, in the peripheral surface of the movable body 12. That is, the opening portions 13 are disposed in the X-axis direction and the Y-axis direction. The number of opening portions 13 is not limited to four, and may be any number greater than or equal to three. Stoppers 14 are disposed inside the opening portions 13, respectively, and the stoppers 14 are fixed to the main body 11 with bolts 15, respectively.

The stoppers 14 regulate the movement range of the movable body 12, and the outermost peripheral portions of the stoppers 14 are provided with first side surfaces 14a which the inner surfaces of the opening portions 13 can contact. That is, on the first side surface 14a, when the strain body 16 is deformed with the movement of the movable body 12, the inner surfaces of the opening portions 13 of the movable body 12 contact the first side surfaces 14a and function as protective mechanisms for protecting excessive deformation of the connecting portions 163 of the strain body 16.

A substrate 20 is provided in the main body 11 so as to face the strain body 16. The substrate 20 comprises a plurality of holes 21a, and is fixed to the main body 11 with fixing screws 21 inserted in the screw holes 21a, respectively. The substrate 20 is electrically connected to strain sensors and the like provided on the strain body 16. The details will be described later.

A cover 22 closing an opening portion 11a is attached to the bottom of the main body 11. That is, the cover 22 comprises a plurality of screw holes 23a, and is fixed to the main body 11 with screws 23 inserted in the screw holes 23a, respectively.

A wire 25 for transmitting a detection signal to the outside is drawn to the side surface of the main body 11. The wire 25 is electrically connected to the substrate 20.

Strain Body in State of Being Mounted in Force Sensor

The strain body 16 in the state of being mounted in the force sensor 10 will be described in detail with reference to FIG. 13. FIG. 13 is a cross-sectional view showing the strain body 16 in the state of being mounted in the force sensor 10.

As shown in FIG. 13, an insulating film 170 is provided on the main surface of the strain body 16, and an electrode 171 is provided on the insulating film 170. Furthermore, an anisotropic conductive film (ACF) 181 is provided on the electrode 171 to be mounted in the force sensor 10. A lead wire 182 for electrically connecting the electrode 171 and the substrate 20 is provided on the anisotropic conductive film 181. The lead wire 182 comprises, for example, an insulating flexible film and an electric circuit (for example, a wire) laid on the film, and is flexible printed circuits (FPCs) configured to be bendable in accordance with the movement of the movable body 12. In addition, a protective sealant 183 is provided so as to cover the main surface of the strain body 16.

[Detecting Operation]

The detection operation of the force sensor 10 having the above-described structure will be briefly described. Detection of an external force (load) applied to a substantially central portion of the movable body 12 in the Z-axis direction will be explained here as an example.

When an external force is applied to the substantially central portion of the movable body 12 in the Z-axis direction, the movable body 12 is moved downward along the Z-axis direction by the external force. Since the main body 11 is fixed and is not moved even by the external force, the movable body 12 moves downward until the inner surfaces of the opening portions 13 on the upper side contact the first side surfaces 14a of the stoppers 14 on the upper side.

For this reason, the bottom surface of the movable body 12 applies pressure to the top surface of the strain body 16, and the connecting portions 163 of the strain body 16, to which pressure has been applied, are deformed. Since the deformation of the strain body 16 is limited to a predetermined range by the stoppers 14, the strain body 16 is protected from destruction by excessive external force. The deformation of the strain body 16 is detected by the above-described strain sensors and reference resistors, and converted into an electrical signal by the bridge circuits and the full bridge circuits BF1 to BF8. The detected electrical signal is passed from the electrode 171 through the lead wiring 182 and the substrate 20 and transmitted to the outside via the wiring 25, and the external force can be detected.

After that, when the application of the external force to the movable body 12 is removed, the connecting portions 163 of the strain body 16 return to an original shape by elastic deformation.

The external-force detection operation in the Z axis direction has been herein described as an example. The same is true of the other external-force detection operations in the X-axis direction and the Y-axis direction. In addition, each of the torque detection operations in the X-axis, Y-axis, and Z-axis directions is also substantially the same as the above-described external-force detection operation, and thus, a detailed description thereof will be omitted.

[Anisotropic Conductive Film (ACF)]

Connection between the electrode 171 and the lead wire 182 using the anisotropic conductive film 181, will be explained. When a plurality of terminals included in the electrode 171 and ends (hereinafter simply called terminals) of a plurality of wires included in the lead wire 182 are electrically connected to each other by using the anisotropic conductive film 181, three processes (ST1 to ST3), i.e., ACF transfer (lamination) process, FPC position adjustment (alignment) process, and pressure-bonding and curing process are mainly required.

FIG. 14 is a cross-sectional view for illustrating a method of connecting an electrode 171 and a lead wire 182 on the strain body, with an anisotropic conductive film shown in FIG. 13. As shown in FIG. 14, in the ACF transfer process, an anisotropic conductive film 181 having an area sufficiently larger than the area of the electrode 171 is disposed on the electrode 171 disposed on the main surface of the strain body 16, in a state of keeping a predetermined tension. Next, a head 200 for ACF bonding is lowered from just above the anisotropic conductive film 181 maintaining the tension to the surface of the electrode 171, and the redundant anisotropic conductive film 181 represented by a broken line larger than the area of the electrode 171 is cut away. As a result, the predetermined anisotropic conductive film 181 is transferred onto the electrode 171 (S1).

FIG. 15 is a plan view showing a state where the lead wire 182 is arranged at a predetermined position on the strain body 16 shown in FIG. 13 by the anisotropic conductive film 181. FIG. 16 is an enlarged plan view showing a portion surrounded by a broken line in FIG. 15. In the FPC position adjustment process, a plurality of terminals included in the electrode 171 and the ends of a plurality of wires included in the lead wire 182 are aligned in a state where the anisotropic conductive film 181 is stuck on the electrode 171.

As shown in FIG. 15 and FIG. 16, positioning is performed with an alignment mark AM16 provided on the strain body 16 and an alignment mark AMF provided on the lead wire 182 at a predetermined position, in this process. The position of the lead wire 182 is determined such that, for example, the positions of alignment marks AM16a and AM16b of the strain body 16 represented by a broken line and positions of alignment marks AMFa and AMFb of the lead wire 182 represented by the solid line have a relationship shown and enlarged in FIG. 16. At this time, the alignment is performed such that one protruding portion of the alignment mark AMFa of the lead wire 182 is sandwiched between two protruding portions of the alignment mark AM16a of the strain body 16, and displacement in the longitudinal direction of the paper surface can be thereby prevented. In addition, displacement in the lateral direction of the paper surface can be prevented by performing the alignment such that the alignment mark AM16b of the strain body 16 and the alignment mark AMFb of the lead wire 182 overlap (ST2).

Figure 17:
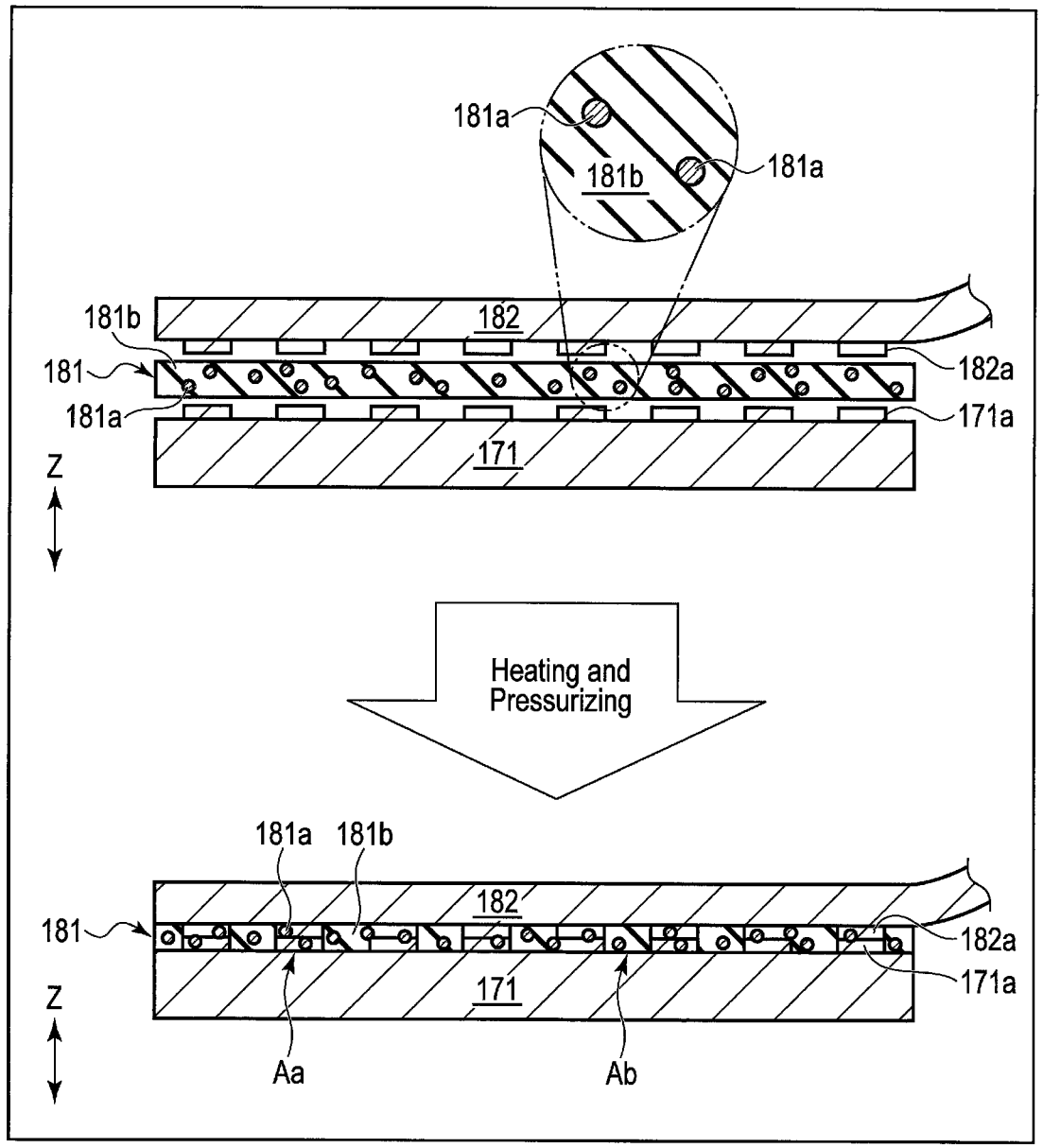
FIG. 17 is a cross-sectional view for schematically illustrating electric connection between a terminal of an electrode and a terminal of a lead wire with an anisotropic conductive film.

FIG. 17 is a cross-sectional view for schematically illustrating electrically connecting between a plurality of terminals (PADs) 171a included in the electrode 171 and a plurality of wire terminals (PADs) 182a included in the lead wire 182 by using the anisotropic conductive film 181. As shown in the upper part of FIG. 17, the anisotropic conductive film 181 has a structure in which conductive particles 181a serving as a conductor are dispersed almost uniformly in a thermoset resin 181b serving as an insulator. Then, in the pressure-bonding and curing process, the electrode 171 serving as a stacked body, the anisotropic conductive film 181, and lead wire 182 are pressurized while being heated, by a head 200 from above the lead wire 182, in a state in which terminals 171a of the electrode 171 and terminals 182a of the lead wire 182 are aligned.

Then, as shown in the lower part of FIG. 17, the conductive particles 181a in the anisotropic conductive film 181 are connected to each other by pressure, at positions Aa sandwiched by the terminals 171a and the terminals 182a, and a conductive path is formed to electrically connect the terminals 171a and the terminals 182a in the longitudinal direction (Z-axis direction) in the drawing. On the other hand, since the pressure to the anisotropic conductive film 181 at positions Ab is lower than that at the positions Aa, the conductive particles 181a in the anisotropic conductive film 181 are not connected to each other and the insulating property is maintained. As a result, a conductive path in the longitudinal direction (Z-axis direction) in the drawing is formed only at the positions Aa sandwiched between the terminals 171a and the terminals 182a (ST3).

The other structures and operations are substantially the same as those in the first embodiment, and thus, a detailed description is omitted.

[Functions and Advantages]

According to the structure and the operation of the force sensor 10 according to the third embodiment comprising the strain body 16, at least the same functions and advantages as those of the first embodiment can be obtained.

Furthermore, in manufacturing processes (ST1 to ST3), the strain body 16 according to the third embodiment can electrically connect the terminals 171a of the electrode 171 and the terminals 182a of the lead wire 182, which is an FPC, to each other, by using the anisotropic conductive film 181 (FIG. 14 to FIG. 17).

Thus, a plurality of terminals 171a of the electrode 171 and a plurality of terminals 182a of the lead wire 182 can be connected at one time, by collecting the wire 172 to the central portion 161 and using the anisotropic conductive film 181. Therefore, the conductivity and the insulation can be maintained together in a few manufacturing processes, and the manufacturing costs can be reduced.

Moreover, reliable electric connection can be secured and reliability can be improved, even in the limited space of the strain body 16, at a fine pitch at which each of the distance between the terminals 171a and the distance between the terminals 182a is, for example, approximately 0.2 mm, as in the present embodiment.

In addition, since the connection using the anisotropic conductive film 181 enables reduction in weight and thinning as compared with connection using solder and connectors and the like, the mounting space can be reduced.

For example, a relationship between a position of a pad (a position of a terminal) of the strain body 16 according to the present embodiment and resistances of anisotropic conductive films is shown in FIG. 18. FIG. 18 shows an example of connection between the strain body 16 and the lead wire 182 using the anisotropic conductive films ACF1 to ACF3 of the same type. As shown in FIG. 18, since the resistance value is almost constant regardless of the position of the pad, in any of the three anisotropic conductive films ACF1 to ACF3, a reliable electrical connection is understood to be secured. In addition, if the resistance value, approximately 0.1Ω, of the terminals 182a of the lead wire 182 is subtracted from the resistance values shown in FIG. 18, the substantial resistance values of the three anisotropic conductive films ACF1 to ACF3 are approximately 0.35Ω to 0.45Ω. The resistance values are values sufficiently lower than a reference value of a resistance value of a general anisotropic conductive film.

In addition, the force sensor 10 restricts the range of operation of the movable body 12, and comprises the stoppers 14 comprising the first side surfaces 14a, which can contact the inner surfaces of the opening portions 13, on their outermost peripheral portions. Thus, the stoppers 14 have a simple shape, and have a protective function for all the six-axis directions. As a result, the force sensor 10, which is highly sensitive and has an advantage in reducing a manufacturing cost, can be provided.

Fourth Embodiment

Example of Other Arrangement of Strain Sensor

A fourth embodiment will be described with reference to FIG. 19. The fourth embodiment relates to an example of the other arrangement of the strain sensor. FIG. 19 is a plan view showing an overall structure of the strain body according to the fourth embodiment as viewed from its main surface side.

As shown and enlarged in FIG. 19, in the strain body 16B according to the fourth embodiment, eight second strain sensors S1, S2, S15, S16, S17, S18, S25, and S26 provided in the second connecting portion 163b are arranged to have a sufficient distance LS from the groove GR to the same extent as the other second strain sensors. The strain body is different from the strain body 16A of the second embodiment with respect to this point. FIG. 19 shows the second strain sensors S17 and S18 alone. For this reason, all the second strain sensors provided in the second connecting portion 163b are not affected by the strain increasing effect from the groove GR. The distance LS is desirably set such that the strain amount of the first strain sensor provided in the first connecting portion 163a is understood to be distinctly different by, for example, 50% from the strain amount of the second strain sensor provided in the second connecting portion 163b.

The other structures and operations are substantially the same as those in the second embodiment, and thus, a detailed description thereof is omitted.

[Functions and Advantages]

In the strain body 16B according to the fourth embodiment, eight second strain sensors S1, S2, S15, S16, S17, S18, S25, and S26 provided in the second connecting portion 163b are arranged to have a sufficient distance LS from the grooves GR to approximately the same extent as the other second strain sensors (FIG. 19).

For this reason, the second strain sensor provided in the second connecting portion 163b is not affected by the strain increase effect from the groove GR, and the strain amounts of the first strain sensors S3, S5, S11, S13, S19, S21, S27, and S29 provided in the first connecting portion 163a can be increased as compared with the strain amounts of the second strain sensor S1, S2, S7, S8, S9, S10, S15, S16, S17, S18, S23, S24, S25, S26, S31, and S32 provided in the second connecting portion 163b. As a result, the detection accuracy of the four bridge circuits BF2, BF4, BF6, and BF8 can be improved.

In addition, since all the second strain sensors provided in the second connecting portion 163b are not affected by the strain increasing effect from the groove GR, the embodiment is advantageous with respect to the feature that the strain amount of the second strain sensors can be made uniform.

Modified Example

While the first to fourth embodiments have been described as examples, the embodiments of the present invention are not limited to the above-described first to fourth embodiments, and can be modified in various ways as necessary as a matter of course.

Objects to which the strain bodies 16, 16A, and 16B are applicable are not limited to the force sensor 10 described in the third embodiment, and they can be applied to various types of sensor as a matter of course.

The present invention is not limited to the embodiments described above, and the constituent elements of the invention can be modified in various ways without departing from the spirit and scope of the invention. Various aspects of the invention can also be extracted from any appropriate combination of constituent elements disclosed in the embodiments. For example, some of the constituent elements disclosed in the embodiments may be deleted. Furthermore, the constituent elements described in different embodiments may be arbitrarily combined.

What is claimed is:

1. A strain body, comprising:
a central portion;
an outer peripheral portion surrounding the central portion;
connecting portions connecting the central portion and the outer peripheral portion;
strain sensors provided on main surfaces of the connecting portions;
reference resistors provided on a main surface of the central portion, and constructing a bridge circuit with the strain sensors;
an electrode provided on a main surface of the central portion and electrically connected to the strain sensors and the reference resistors to take a detection signal of the bridge circuit;
a lead wire making electric connection between the electrode and the outside; and
an anisotropic conductive film provided between the electrode and the lead wire to make electric connection between a terminal of the electrode and a terminal of the lead wire.

2. The strain body of claim 1, wherein
each of the connecting portions includes a first connecting portion adjacent to the outer peripheral portion and a second connecting portion adjacent to the central portion, and
the first connecting portion includes a strain increasing portion generating larger strain than strain generated in the second connecting portion.

3. The strain body of claim 2, further comprising:
at least one of the strain sensors constructs the bridge circuit on a main surface of the first connecting portion.

4. The strain body of claim 2, wherein
the strain sensors construct a full bridge circuit on a main surface of the second connecting portion.

5. The strain body of claim 2, wherein
the strain increasing portion includes a groove recessed in a thickness direction of the strain body.

6. The strain body of claim 1, wherein
elasticity of the outer peripheral portion and the connecting portion is larger than elasticity of the central portion.

7. The strain body of claim 1, further comprising:
a wire provided on main surfaces of the central portion and the connecting portion to electrically connect the strain sensors, the reference resistors, and the electrode, wherein
the strain sensors, the reference resistors, the electrode, and the wire are arranged symmetrically on both sides of diagonal lines connecting corner portions of the outer peripheral portion.

8. A force sensor comprising:
a strain body comprising:
a central portion;
an outer peripheral portion surrounding the central portion;

connecting portions connecting the central portion and the outer peripheral portion;

strain sensors provided on main surfaces of the connecting portions;

reference resistors provided on a main surface of the central portion, and constructing a bridge circuit with the strain sensors;

an electrode provided on a main surface of the central portion and electrically connected to the strain sensors and the reference resistors to take a detection signal of the bridge circuit;

a lead wire making electric connection between the electrode and the outside; and an anisotropic conductive film provided between the electrode and the lead wire to make electric connection between a terminal of the electrode and a terminal of the lead wire;

a cylindrical main body; and a cylindrical movable body capable of operating to the main body, wherein the central portion of the strain body is connected to one of the main body and the movable body, and the outer peripheral portion of the strain body is connected to the other of the main body and the movable body.

9. The force sensor of claim 8, further comprising:

at least three circular opening portions provided on a surrounding of the movable body;

stoppers arranged inside the respective opening portions, and each including a first side surface having a first outer diameter smaller than a diameter of each of the opening portions; and fixing members fixing the stoppers to the main body.

\* \* \* \* \*